(No Model.) 2 Sheets—Sheet 1.

W. ROBINSON.
CAR TRUCK.

No. 243,797. Patented July 5, 1881.

WITNESSES.
Henry W. Williams
D. M. Williams

INVENTOR
William Robinson (No Model.) 2 Sheets—Sheet 2.

W. ROBINSON.
CAR TRUCK.

No. 243,797. Patented July 5, 1881.

WITNESSES. INVENTOR.

UNITED STATES PATENT OFFICE.

WILLIAM ROBINSON, OF BOSTON, MASSACHUSETTS.

CAR-TRUCK.

SPECIFICATION forming part of Letters Patent No. 243,797, dated July 5, 1881.

Application filed December 6, 1880. (No model.)

*To all whom it may concern:*

Be it known that I, WILLIAM ROBINSON, of Boston, in the county of Suffolk and State of Massachusetts, have invented new and useful Improvements in Railway-Car Trucks, of which the following is a specification.

This is an improvement in trucks adapted particularly to steam-railway cars, by means of which each axle in the truck will automatically assume, when upon a straight track, a position at right angles thereto, and when upon a curved track a position upon a line radial to the circle or arc of a circle described by said track, the principal objects being, by lessening friction, to enable the locomotive to draw a heavier load, to reduce the wear of both wheels and track, to prevent lateral vibration, and hence wear of the car and annoyance to the passengers, and to lessen the danger of the wheels leaving the track.

Figure 1:
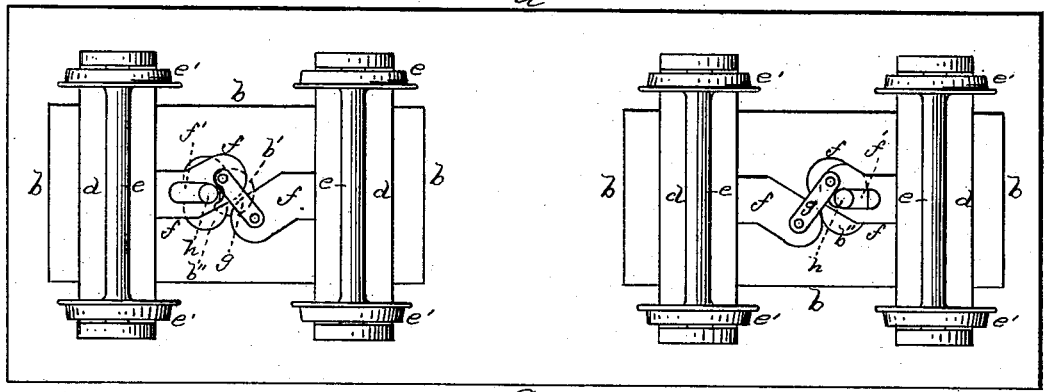
Figure 2:
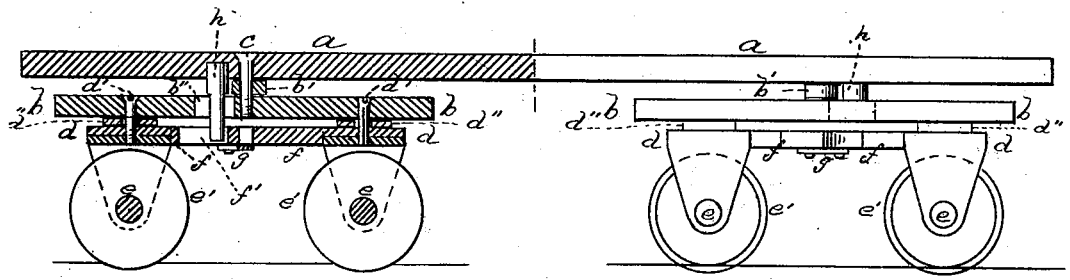
Figure 3:
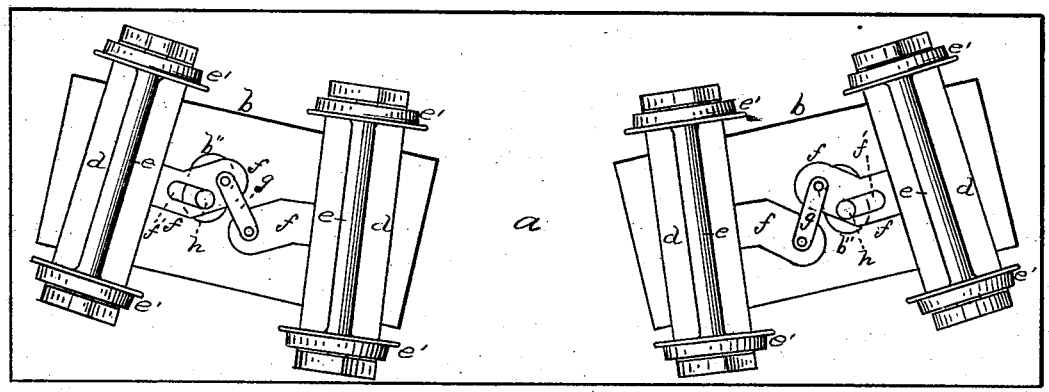

In the accompanying drawings, in which similar letters of reference indicate like parts, Figure 1 is a plan view of the under side of a car-bottom, provided with trucks embodying my invention in the position assumed upon a straight track. Fig. 2 is a view a part of which is a side elevation and a part a central vertical longitudinal section, the trucks being in the same position. Fig. 3 is a plan of the under side, with the trucks in the position assumed upon a curved track, each axle being upon a radial line of the circle or arc described by said track. Figs. 4, 5, 6, and 7 are all plan views, exhibiting modifications.

$a$ represents the car-bottom; $b$, each main truck, centrally pivoted at $c$ to the car-body, provided, if desired, with the intermediate disk, $b'$, and having the opening or hole $b''$; and $d$ $d$ are two supplemental trucks carrying the wheels $e'$ and axles $e$, each supplemental truck $d$ being centrally pivoted at $d'$ to the main truck $b$, and provided, if desired, with the intermediate disk, $d''$.

Projecting inwardly horizontally toward each other from the supplemental trucks $d$ $d$, and substantially of the shape shown, are the extension-pieces $f f$, connected by the link $g$, pivoted at each end to said extension-pieces. The extension $f$, projecting from the outer supplemental truck—i. e., the one nearer the end of the car—has a slot, $f'$.

$h$ is an eccentric-pin secured to the car-body, and extending down through opening $b''$ in the main truck and into or through slot $f'$ in the extension projecting from the outer supplemental truck $d$.

When the wheels strike a curve the rails impart an end movement to the axles, causing the main truck to turn on its axis. (See Fig. 3.) This movement, by means of the pin $h$, which is placed eccentrically to or one side of the swiveling-point $c$ of the car-body on the main truck $b$, and by means of the centrally-pivoted supplemental trucks $d$ $d$, provided with said extensions, constructed substantially as described, turns the supplemental trucks so that the axles of all the supplemental trucks are on lines which are radii of the same circle—viz., the circle described by the curved track.

In a six-wheeled truck the central axle would not swivel in the main truck, but would be fixed at right angles thereto, as it is evident that it would need no mechanical radiation, for it would always, when traveling over a curved track, be on a line radial to the circle described by said track.

Figure 4:
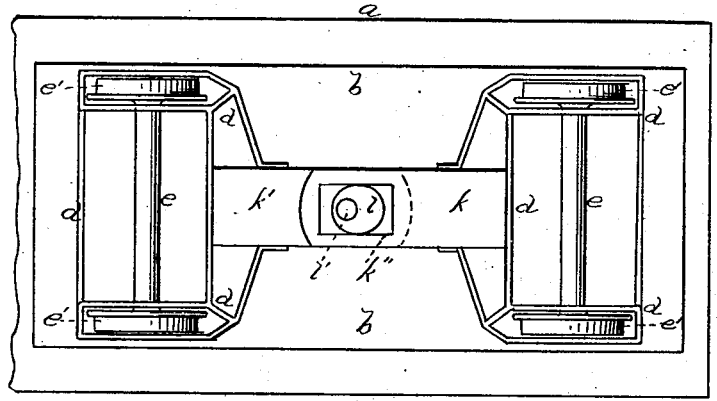

In the modification shown in Fig. 4 the supplemental tracks $d$ $d$ are provided with inwardly-projecting bars $k$ $k'$, the former underlapping the latter, and both having similar slots, $k''$, in which lies a disk, $l$, thick enough to affect both bars, eccentrically fixed upon the pin $l'$, which corresponds with the pivotal pin $c$, Fig. 2, and extends from the car-body through the main truck centrally between the pivotal points in the centers of the supplemental trucks. When the main truck turns the eccentric $l$ $l'$ moves each bar $k$ $k'$, so that the supplemental trucks are radiated thereby, each independently of the other.

Figure 5:
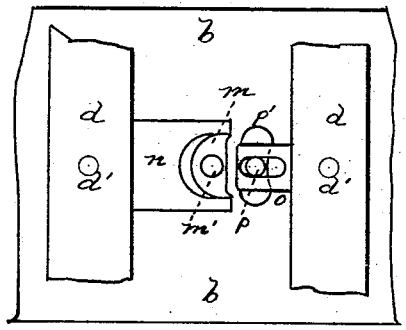

In the modification shown in Fig. 5 the supplemental trucks $d$ $d$ are radiated independently of each other—one by means of the disk $m$, eccentrically placed upon the pivotal pin $m'$, corresponding with pivot $c$, Fig. 2, and centrally located between the pivots $d'$ $d'$ of the supplemental trucks, said disk lying in the embracing-extension $n$, and the other by means of the pin $p$, extending from the car-body, one side of the swiveling point of the car-body on the main truck, through opening $p'$ in the main truck, into slotted extension $o$.

Figure 6:
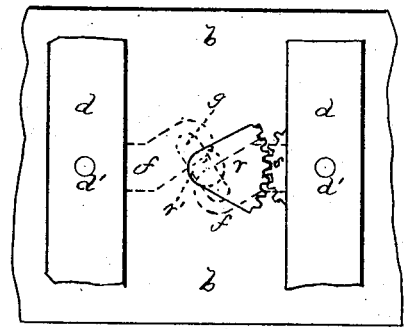

In Fig. 6 the modification consists in substituting for the eccentric-pin $h$ the gear $r$, fixed to the pivotal pin $r'$, located in the same position as pins $m'$ and $l'$, Figs. 5 and 4, and engaging the gear $s$, rigidly secured to one supplemental truck. The connections $f\,f$ are used as in the first three figures.

Figure 7:
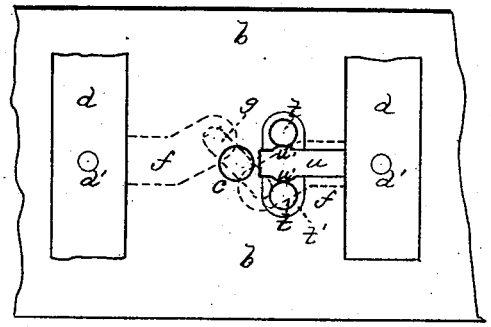

In Fig. 7, in place of the eccentric-pin $h$, two pins, $t\,t$, extend from the car-body through opening $t'$ in the main truck to opposite sides of the protuberances $w'\,w'$ on the bar $u$. As the trucks radiate the protuberances slip by the pins $t\,t$ in opposite directions, and as the trucks return to a right-angled position the protuberances and pins assume the relative positions shown in the figure.

Having thus fully described my invention, what I claim, and desire to secure by Letters Patent, is—

1. In a railway-car truck, the combination, with the main truck and two supplemental trucks pivoted to the main truck, of an eccentric pin or device secured to the car-body eccentrically to the swiveling or pivotal point of the car-body on the main truck, said pin being adapted to engage directly or indirectly one or both supplemental trucks, for the purpose of radiating the same, substantially as described.

2. In a railway-car truck, the combination of the main truck $b$, pivoted at $c$ to the car-body, the supplemental trucks $d\,d$, pivoted at $d'\,d'$ to the main truck, and provided with suitable connecting devices, and the eccentric-pin $h$, adapted to radiate the trucks, substantially as set forth.

WILLIAM ROBINSON.

Witnesses:
HENRY W. WILLIAMS,
B. W. WILLIAMS.